United States Patent [19]

Ruoss

[11] 3,765,585
[45] Oct. 16, 1973

[54] CONTROL ARRANGEMENT FOR SELF-CLOSING CONTROL ROD LATCHES

[75] Inventor: Christian William Ruoss, Enfield, Conn.

[73] Assignee: Combustion Engineering Inc., Windsor, Conn.

[22] Filed: Dec. 23, 1971

[21] Appl. No.: 211,445

[52] U.S. Cl.............. 226/59, 226/163, 226/145, 226/150, 310/14
[51] Int. Cl............................................ B65h 17/36
[58] Field of Search................... 226/59, 162, 112, 226/163, 164, 165, 166, 52, 54, 145, 146, 147, 149, 150, 144; 214/27; 176/36 R; 310/12, 14; 318/125

[56] References Cited
UNITED STATES PATENTS

| 3,626,493 | 12/1971 | Behmke............................ 226/54 |
| 3,480,807 | 11/1969 | Downs et al.......................... 310/12 |
| 3,572,161 | 3/1971 | Lichtenberger et al........... 176/36 R |
| 3,124,513 | 3/1964 | Hawke et al....................... 176/36 R |

*Primary Examiner*—Allen N. Knowles
*Attorney*—Eldon H. Luther et al.

[57] ABSTRACT

Control arrangement for a nuclear reactor non-scramming control rod drive of the magnetic jack type having a self-closing latch for preventing dropping of the rod in the event of loss of electrical power to the associated solenoids. The solenoid which actuates the self-closing latch is connected electrically in series with a solenoid which actuates a moveable gripper and the two are controlled as one. The two magnetic circuits associated therewith are designed to provide an overlap in operation which avoids the possibility of a dropped rod.

7 Claims, 3 Drawing Figures

CONTROL ARRANGEMENT FOR SELF-CLOSING CONTROL ROD LATCHES

BACKGROUND OF THE INVENTION

In a magnetic jacking type control rod drive, the control rod is moved through a plurality of stepping actions. Electromagnetic coils surround the control rod housing and are sequentially operated to perform a number of lifting or lowering steps. Certain coils will energize gripper or latch assemblies which grippingly engage with axially spaced grooves on a control rod extension. Other coils will operate to lift or lower at least one of the gripper or latch assemblies a short distance. Another gripper may be engaged to hold the control rod in this position so that the first gripper may be disengaged and returned to a starting position in preparation for gripping and raising or lowering another step. In scramming type rods these grippers are arranged so as to disengage the control rod extension on loss of power thereby permitting the reactor to be scrammed by lowering the control rod by gravity even though power is not available to the jacking means. This is accomplished by letting the control rod fall under the influence of gravity.

Some control rods, particularly those of the scramming type, employ anti-ejection latches which prevent the rod from being ejected from the reactor in the event a power failure disengages the conventional grippers and a condition of overpressure occurs within the reactor. Such an anti-ejection latch is typified by that disclosed in German Pat. No. 1,206,102 issued June 16, 1966 to Franz Schreiber. This type of latch is effective to prevent rod ejection but provides little or no resistance to a free fall of the control rod so that the reactor may readily be scrammed during an emergency.

Another type of control rod, that of the non-scramming type, is electromagnetically stepped in a manner similar to that of the scramming type of control rod. The non-scramming type of control rod is generally used in connection with one or part length control rods used to control local reactivity. Such rods are controlled separately from the main control rods and generally contain the neutron "poison" in the lower portion only of the rod, with the "poison" portion of the rod normally positioned in the vicinity of the local activity which it is desired to control. If these rods were allowed to trip or "scram" upon the loss of electricity, the rod would drop to the bottom of the reactor and the "poison" portion would be removed from the region of the local reactivity and a "non-poison" portion of the rod would take its place in the aforementioned area of reactivity. This would increase the reactivity of the reactor just at a time when every effort is being made to reduce the reactivity. Therefore, it is necessary to provide such a non-scramming rod with a gripper or latch which will prevent movement of the control rod in either direction in the event of an electrical failure or a scram situation. Such a gripper is normally designed to be self-closing to grippingly engage the rod in the rod in the event of loss of power. One such self-closing gripper arrangement which successfully prevents a part length control rod from dropping in the event of a power failure is that depicted and described in the application of Harold V. Lichtenberger and Christian W. Ruoss for "Self-Closing Control Rod Grippers" Ser. No. 211205 filed Dec. 23, 1971. The above-mentioned application describes a self-closing gripper having a geometry such that its linkage forms an overcenter toggle arrangement which will prevent the gripper or latch from acting as a ratchet and positively locks it in position upon the loss of electricity.

Conventionally each of the electromagnetic coils which actuate and move the several latches will be supplied with electricity from sources which are separate and are individually switched or controlled. A master timer or controller provides the requisite switch to each power source associated with a particular coil.

SUMMARY OF THE INVENTION

This invention relates to a control arrangement for operating the self-closing latch associated with a non-scramming type of control rod in a nuclear reactor. The electromagnet which serves to actuate the self-closing latch is connected electrically in series with an electromagnet which actuates a rod moving latch into and out of engagement with the control rod. By connecting the two electromagnets electrically in series, a power supply heretofore used may be eliminated and the power switching operating is simplified. The above mentioned connection of electromagnets will result in the required stepping operation of the magnetic jacking unit and is preferred because of the resulting safety afforded. The self-closing latch is normally in gripping engagement with the rod and requires energization of its associated electromagnet for releasing said latch from engagement, while the rod moving latch is normally not in gripping engagement with the rod and requires energization of its associated electromagnet to bring it into gripping engagement. For this reason connecting these two electromagnets in series results in one or the other of the latches always being in gripping engagement with the rod, even in the event of electrical failure.

Additionally the magnetic circuits associated with each of the electromagnets connected in series may be structured to provide a short overlap in the actuation of the associated latches such that there is no time when neither latch engages the rod and there is a brief time when both latches engage the rod. This structuring of the magnetic circuits ensures that the rod will always be grippingly engaged even in the event of electrical failure and further allows actuation or release of both latches to be effected with but a single change of voltage applied to the series connected circuit.

DESCRIPTION OF THE PREFERRED EMBODIMENT

Figure 1:
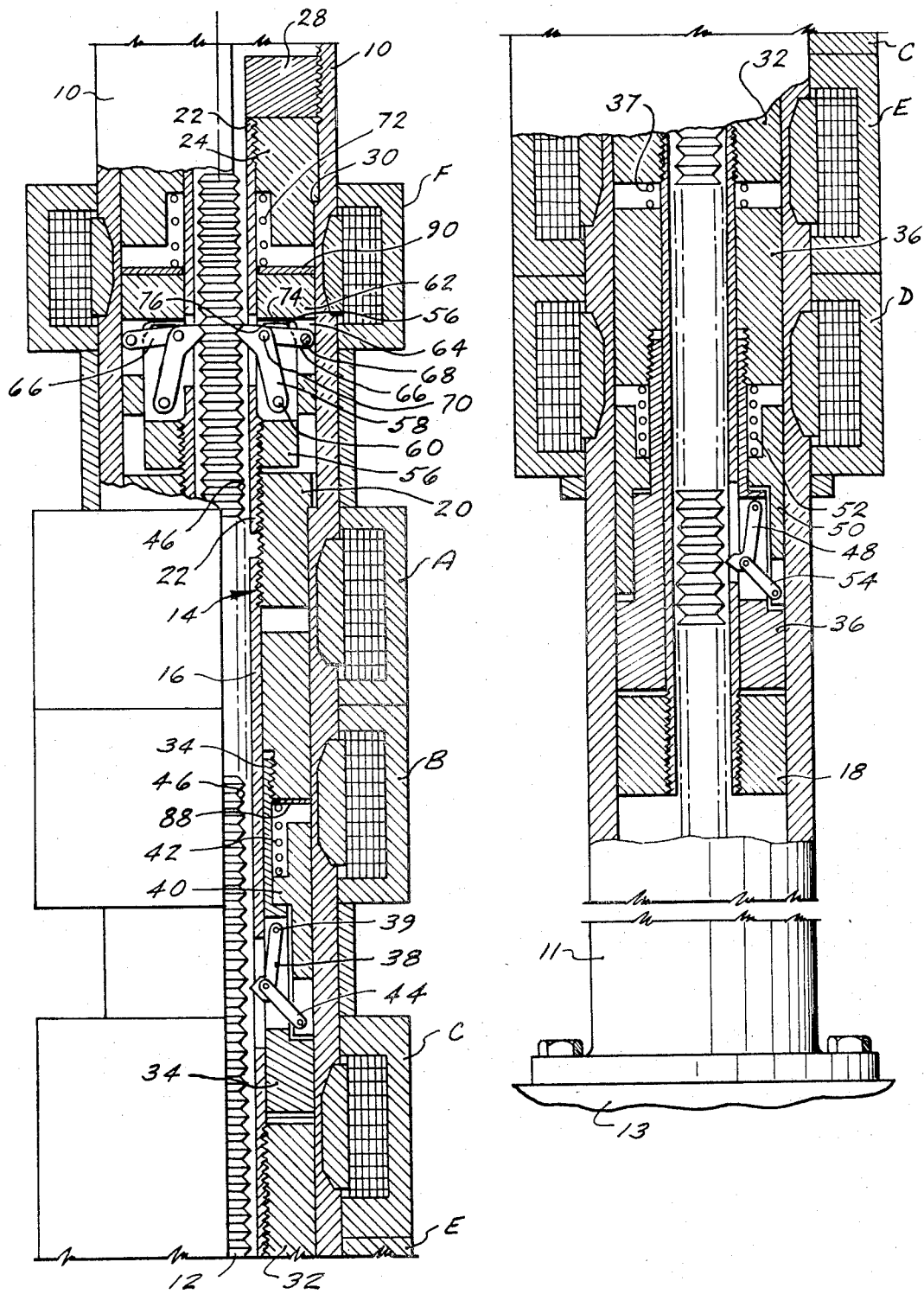
FIG. 1 is a side elevation, partially in section, and with parts broken away of the self-closing latch shown in gripping relation with a control rod together with the jacking mechanism for the rod.

This invention is shown in connection with a control rod drive including self-closing rod latches similar to that shown and claimed in the application of Lichtenberger and Ruoss earlier mentioned to which reference may be made for further details. In the presently preferred embodiment shown in the drawings, a casing or support 10 in the form of an air-tight tube is secured in air-tight relation at the lower end to a removable head 11 of the nuclear reactor vessel 13 and is closed at the upper end to provide a hermetically sealed housing for the control rod and extension 12 which extends into the reactor vessel and is surrounded by the casing 10. The control rod is axially moveable in step-by-step motion inside of the casing 10 by selective actuation of solenoids A, B, C, D, and E arranged outside of and around the casing 10. A tubular member shown generally at 14 is positioned inside of the casing 10 and surrounding the control rod 12. This tubular member 14 is secured at its upper end to the upper portion of the casing 10 and supports all of the internal operating mechanism for axially moving and holding the control rod. The control rod extension 12 is linearly axially slidable inside of the tubular member 14. The tubular member 14 comprises a tube 16, which may be of magnetic or nonmagnetic material but is preferably of nonmagnetic material, which is threaded into a sleeve 18 of nonmagnetic material at the lower end and a sleeve 20 of magnetic material at the upper end. A tube 22 similar to tube 16 is threaded into the opposite side of sleeve 20 and at its opposite end is threaded into a sleeve 24 of magnetic material. The sleeve 24 is forced inward by nut 28 threaded into casing 10 to force sleeve 24 down against shoulder 30 in casing 10 and thus support the entire tubular member 14 fixedly in the casing 10.

The sleeves 18 and 20 are thus secured in fixed position in the casing 10. Any suitable locking means such as pins (not shown) may be used to prevent relative turning of the threaded parts. A sleeve 32 which is of magnetic material is also secured in fixed position to sleeve 18 of the tubular member 14 intermediate the sleeves 18 and 20. Slidably mounted on the tubular member 14 is an upper rod feeder or moving member 34 of magnetic material having one end adjacent to sleeve 20 and the other end adjacent the sleeve 32 so as to be reciprocated between the two sleeves which will act as stops for the moving member and limit its linear movement. A lower feeder or moving member 36 is mounted for axial linear sliding movement on the tubular member 14 and has its upper end adjacent the lower end of sleeve 32 and its lower end adjacent the upper end of sleeve 18 for axial movement between the sleeves which will act as stops limiting such axial linear movement.

When solenoid A is energized moving member 34 is drawn upward toward sleeve 20 by the magnetic flux through sleeve 20 and moving member 34 and when solenoid C is energized moving member 34 is drawn downward toward sleeve 32 by the magnetic flux through sleeve 32 and the lower end of moving member 34. Energization of solenoid E will cause moving member 36 to be drawn upward toward sleeve 32 and spring 37 biases moving member 36 downwardly to aid its downward movement toward sleeve 18 when solenoid E is de-energized. Thus solenoids A, C, and E provide the means for selectively moving members 34 and 36 in either of two opposite directions between their respective stops.

A latch or gripper 38 is pivotally mounted on moving member 34. Latch operating sleeve 40 is slidably axially moveable on upper moving member 34 and is spring pressed downward by biasing spring 42. A link 44 is pivoted at one end to sleeve 40 and at the other end to the outer end of latch or gripper 38 so that axial movement of the sleeve 40 relative to moving member 34 will force the latch or gripper 38 about its pivot and into gripping relation with the control rod 12 and connect member 34 with rod 12 or when moved in the opposite direction withdraw the latch so as to disconnect the moving member 34 from the control rod 12. Control rod 12 is provided with a series of suitable projections 46 with resulting recesses therebetween coacting with the latch 38 to provide the necessary gripping relation. When the latch 38 is in gripping relation with the rod 12 axial movement of the moving member 34 will carry the rod 12 along with it to move the rod 12 in the selected direction and will limit movement of rod 12 to that of member 34 between its cooperating stops. The rod moving member 34 acts as a support for the link 38 and the pivot 39 connecting the link 38 with its support 34 holds the link 38 against linear axial movement with respect to its support 34. The lower moving member 36 has a pivoted latch 48, a latch operating sleeve 50, a sleeve biasing spring 52 and a link 54 connecting the sleeve 50 and the latch 48 mounted thereon and operating the same as that described in connection with the upper moving member 34. Energization of solenoid B will draw the sleeve 40 which is of magnetic material toward the upper portion of moving member 34 to force the latch 38 into gripping relation with the rod 12 and the spring 42 and gravity will force the sleeve 40 downward to release the gripping action of the latch 38. Similarly energization of solenoid D will draw the sleeve 50 which is of magnetic material upwardly against the action of spring 52 to the upper portion of moving member 36 to force the latch 48 into gripping relation with the rod 12 and the spring 52 and gravity will force the sleeve 50 downward to release the latch 48 from such gripping relation.

Typically moving member 34 and latch 38 provide the major axial stepping of rod 12 and lower latch 48 is emploeyd to hold the rod while moving member 34 and latch 38 are repositioned to begin a new step. Accordingly lower moving member 36 will move a much smaller axial distance than upper moving member 34. The axial travel of moving member 36 is limited to that necessary to transfer the load of rod 12 between latches 38 and 48. Solenoids A and C then are used in the major stepping function and solenoid E is used in the rod or load transfer function to lift moving member 36. The downward bias of spring 37 and the weight of rod 12 complete the load transfer cycle upon de-energization of solenoid E.

On tube 22, at the upper portion of the tubular member 14, a sleeve 56 is secured to tube 22 by being threaded thereon and locked in position by suitable means such as a pin (not shown) extending through the sleeves 56 and 22. The upper end of the sleeve 56 may receive one or more latch levers 58, preferably at least three spaced circumferentially. Each latch 58 is mounted on a pivot 60 in the sleeve 56 which together with the tube 22 and the casing 10 act as a support for the latch. Latch 58 has a rod gripping portion adjacent one end. The pivot 60 serves to hold the latch against linear longituidnal movement with respect to its support. A sleeve 62 which acts as a slider is mounted for linear longitudinal axial movement in the casing 10 and on tube 22. The sleeve 62 is slotted at 64 to receive a link pivoted at one end at 68 in the slider 62 and pivoted at the other end at 70 at the end of latch 58 adjacent the gripping portion remote from the pivot 60. A biasing spring 72 mounted in sleeve 24 urges the slider 62 downwardly away from the sleeve 24. This downward movement is limited by the contact of ledge 74 on sleeve 62 with the upper end of sleeve 56 which acts as a stop for the movement of sleeve 62. The geometry of the link 66 and latch 58 is such that when the sleeve 62 is positioned by the stop 76 the links and the latch and their pivots will be positioned so as to form an over-center toggle. In this position any force applied to the latch 58 to turn it outward away from this inward gripping position with the rod 12 will tend to force the slider or sleeve 62 further downward against the stop 76 and thus securely mechanically lock the latch 58 in gripping relation with the rod 12 and thus hold the rod 12 securely against linear movement in either direction. Gravity will assist in holding this sleeve 62 in its down position and the toggle in its locked position as well as initially urging the sleeve 62 downward. The downward movement of the sleeve 62 will force the gripping portion at the outer free end of the latch 58 into the recesses between the projections 46 on the rod 12 to provide the necessary gripping action.

A sixth magnet or solenoid, F, is mounted adjacent the upper end of casing 10 and when energized serves, through its magnetic flux, to draw the sleeve 62 upwardly against the action of biasing spring 72 and gravity to a position adjacent the lower end of sleeve 24 to thus move the outer end of link 66 upward and withdraw the latch 58 out of gripping relation with the rod 12. The rod will then be free to be moved in either direcrton by the feeding mechanism previously described. Hence whenever the solenoid F is demagnetized the latch 58 will be forced by spring action and gravity into gripping relation with the rod 12 so that upon loss of electrical energy the rod 12 will be immediately gripped and held against axial movement in either direction. The latch 58 and its actuating mechanism will therefore act as a lock to prevent the control rod from dropping upon a loss of electricity or a scram condition and will also act as an antiejection lock.

In order to allow correct operation of the mechanism which steps rod 12, it is desirable that latch 58 be in gripping engagement with the rod when no axial motion is intended and that it be disengaged from the rod when axial motion is to be effected. Conventionally, each of solenoids A, B, C, D, E, and F has been provided with a separate power source which is intermediate a main power source and the respective solenoid. These separate intermediate power sources are individually controlled by a central sequencer or timer to control their output voltage.

According to the invention, solenoid F is electrically connected in series with another solenoid which results in correct stepping operation of rod 12 with singular control of the intermediate power source which energizes the two solenoids. It is preferred to connect solenoid B in series with solenoid F. Generally speaking, during such time as solenoid B is energized and latch 38 is engaging rod 12, solenoid F is also energized to release self-closing latch 58 from rod engagement thus permitting latch 38 to be moved axially to effect the desired stepping action. Conversely, when solenoid B is de-energized, solenoid F is also de-energized and self-closing latch 58 moves into gripping engagement with the rod to prevent any significant axial motion. Load transferring latch 48 is designed to move only small axial distances and may effect the short axial load transferring movement while latch 58 is actuated to engage or be coupled with rod 12.

Figure 2:
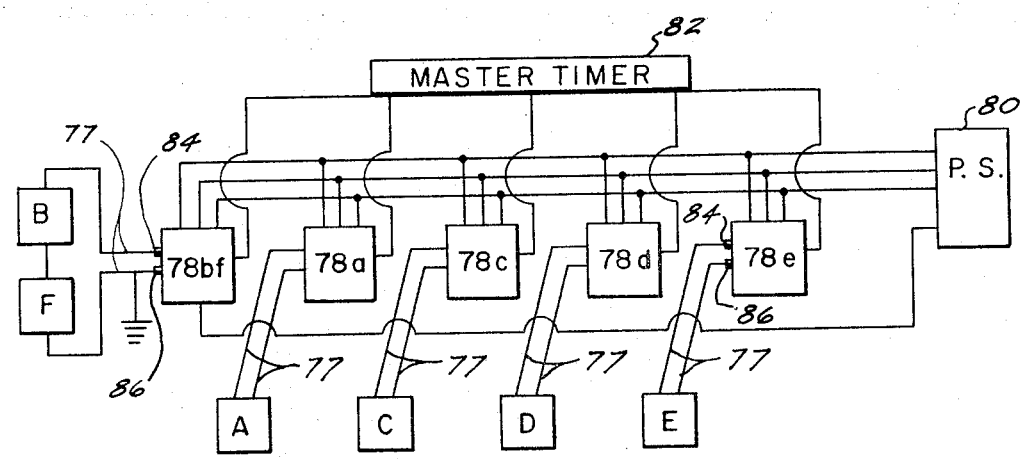
FIG. 2 is a schematic diagram showing the electrical arrangement of the several solenoids and particularly the series connection of the self-closing latch actuating solenoid with the rod moving latch actuating solenoid.

As seen in FIG. 2, each of solenoids A, C, D, and E is individually connected by conductors 77 to the outputs of corresponding intermediate power supplies 78a, 78c, 78d, and 78e respectively. Solenoids B and F are connected in series across intermediate power supply 78 bf. Each of the intermediate power supplies 78a, 78bf, 78c, 78d, and 78e is connected to master power source 80 which is usually three phase line voltage. Each of the intermediate power supplies include means (usually SCRs) for rectifying and switching the three phase line voltage supply. Control signals from a master timer or sequencer 82 of a type well known in the art are applied to each of the intermediate power supplies to control the amplitude of the DC voltage appearing at their output terminals 84 and 86. This control varies from one intermediate power supply to another in a prearranged sequence, a portion of which is to be discussed later. Generally speaking the control signals serve to switch the output of each intermediate power supply from a zero voltage state to a high DC voltage (about 150 volts), this voltage being applied to the electromagnetic circuits associated with each of the various jacking mechanisms to overcome certain bias forces and actuate the moveable members in the magnetic circuit. As the length of a particular air gap is decreased in a magnetic circuit, the magnetomotive force (MMF) required to maintain the gap closed or in a position of decreased length is greatly decreased and voltage applied to a solenoid may be reduced to a holding value which provides a decreased MMF. Finally the voltage is returned to zero whereupon the biasing forces return the moveable magnetic member to an initial position.

Connecting the actuating solenoid F of self-closing latch 58 electrically in series with the actuating solenoid B of rod lifting latch 38 ensures that an electrical outage or failure in the electrical circuits associated with any of the several solenoids will not result in unrestrained axial movement of rod 12, but rather, ensures that the rod will be grippingly engaged. In terminal 86 of power supply 78bf is maintained at or near ground potential, it is desirable to connect solenoid F electrically closest thereto as shown in FIG. 2 such that in the event of an electrical short to ground occurring in the connection between solenoid B and solenoid F, the self-closing latch 58 is maintained in rod gripping engagement.

A further advantage is obtained by designing the magnetic circuits associated with latches 38 and 58 such that, when a latch is being moved either into or out of engagement with the rod, a short period results in which both latches are in rod engaging relationship. While this result might be accomplished by proper sizing of the springs 42 and 72 relative to one another to create a stronger engaging bias in latch 58 than disengaging bias in latch 38, space limitation within casing 10 generally precludes use of a spring that would be of sufficient size for latch 58.

Figure 3:
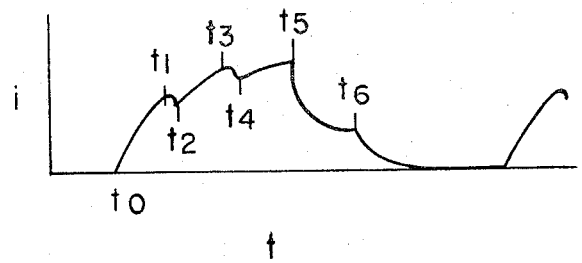
FIG. 3 is a time plot of the current in the above mentioned circuit having said solenoids connected in series and showing the sequence of latch operation associated therewith.

Because both solenoids B and F experience the same current at any moment, their respective ampere turn products (NI) at any moment have the same relationship as that of the number of turns in the two solenoids. The ampere turns of a solenoid represent its MMF at any moment. The MMF divided by the reluctance (R) of the magnetic circuit represents the total flux ($\phi$) in the circuit. If all other aspects of the two magnetic circuits associated with solenoids B and F are the same, the magnetic forces acting upon the moveable members 40 and 62 respectively are proportional to the number of conductive turns in the solenoids. In the preferred embodiment of the invention, the magnetic reluctance, R, is substantially the same in the magnetic circuits associated with both solenoids B and F and solenoid B is formed of 800 conductive turns or coils and solenoid F of 500 turns. The effects of such an arrangement are seen in FIG. 3 wherein the current in the coils of the two series connected solenoids is plotted against time. This current plot results when a control signal from master timer 82 switches the DC voltage at the output terminals 84 and 86 of power supply 78 bf from 0V. to 150V. at time, $t.$, and then reduces the DC voltage to a holding level of about 25 volts at time, $t_5$, and finally returns the voltage to zero volts at time, $t_6$.

At $t_0$ the current and accordingly the MMF in solenoids B and F begins to increase in the manner characteristic of inductive circuits to the level or levels required to overcome the biasing force or forces. At $t_1$ the MMF of solenoid B is sufficient to begin moving latch 38 into engagement with rod extension 12. As sleeve 40 which actuates latch 38 is magnetically moved toward member 34 which is presently stationary, a back emf is induced in the electrical circuit producing the down turn in current between $t_1$ and $t_2$. At $t_2$ sleeve 40 has reached its limit of travel and stops. The latch 38 is now in gripping engagement with rod 12. The current continues to build from time $t_2$ until it provides a sufficient MMF in the magnetic circuit of solenoid F to begin moving latch 58 out of engagement with rod 12. As with solenoid B, when sleeve 56 is magnetically moved towards sleeve 24 which is stationary, a back emf is induced causing the down turn in current between $t_3$ and $t_4$. At $t_4$ sleeve 56 has reached its limit of travel and latch 58 no longer engages rod 12. Because there is no longer a back emf, the current builds again after $t_4$ to its final value which is at least as great as that at $t_3$ and is determined by the electrical impedance of the circuit. At $t_5$ the voltage is reduced to the holding value and the current decreases to a holding level which continues until $t_6$ at which time the voltage is switched to zero or some value less that that required by sleeves 40 and 56 to oopose their respective biasing forces. The sequence is repeated at the frequency of about 1 Hz and the delay between engagement of latch 38 and disengagement of latch 58 is typically 0.25 seconds.

Means are employed to maintain non-magnetic gaps of predetermined length between the magnets following energization of the solenoids and movement of the magnet pole pieces into close relationship. These gaps increase the reluctance which opposes the MMF created by the current in the solenoids and thereby serve to reduce the magnetic force which acts upon a magnet pole piece at a particular MMF. This reduction in the magnetic holding force enables gravity and/or biasing means to more rapidly overcome the holding force and return the moveable magnets to their non-energized biased positions. Non-magnetic spacer shims 88 and 90 are typical of such spacer means. Spacer 88 is affixed to sleeve 40 or 34 to maintain a gap between sleeve 40 and sleeve 34 when solenoid B is energized. Spacer 90 is affixed to sleeve 62 or 24 to maintain a gap between sleeve 62 and sleeve 24 when solenoid F is energized. In the preferred embodiment spacer 90 is about 0.060 inches thick in the axial direction whereas spacer 88 is only about 0.030 inches thick. The resulting difference in gap lengths aids the difference in the number of turns between the solenoids associated with latches 38 and 58 to significantly reduce that magnetic force holding sleeve 62 relative to that which holds sleeve 40. This results in latch 58 being returned to gripping engagement with rod 12 more rapidly than latch 38 being disengaged from the rod when the holding voltage is terminated at $t_6$. This overlapping engagement during both operations of latches 58 and 38 provides additional safety against inadvertant dropping of rod 12.

It will be understood that the embodiment shown and described herein is merely illustrative and that changes may be made without departing from the scope of the invention as claimed.

What is claimed is:

1. In combination, a support; a control rod supported in and longitudinally, linearly, reciprocable with respect to said support; an electromagnetic jacking mechanism for reciprocating said rod longitudinally of said support in opposite directions including at least one lifting magnet and at least one lifting latch actuating magnet; a self-locking latch fixed on said support against linear movement longitudinally of said rod including biasing means forcing said self-locking latch into gripping relation with said rod and including means mechanically locking said rod against movement in either direction with respect to said support; electromagnetic means for actuating said self-locking latch, upon energization, to overcome said locking means and biasing means to move said latch out of gripping relation with said rod; and means electrically connecting said self-locking latch actuating electromagnetic means, with at least one of said lifting and lifting latch actuating magnets for simultaneous electrical energization thereof.

2. The apparatus of claim 1 wherein said electromagnetic means for actuating said self-locking latch is electrically connected in series with said lifting latch actuating electromagnet whereby to effect simultaneous energization thereof.

3. In combination a support; a control rod supported in and longitudinally, linearly, reciprocable with respect to said support; an electromagnetic jacking mechanism for reciprocating said rod longitudinally of said support in opposite directions including at least one rod moving means and at least one rod moving latch and its operating means including first biasing means providing a selected biasing force to said rod moving latch acting to move said latch out of gripping engagement with said rod and first electromagnetic means for producing a force on said latch when energized to overcome the force of said first biasing means and actuate said latch into gripping engagement with said rod; a self-closing latch fixed on said support against linear movement longitudinally of said rod and having operating means including second biasing means providing a selected biasing force to said self-closing latch acting to move said latch into gripping engagement with said rod and second electromagnetic means producing a force on said latch when energized for overcoming the force of said second bias means to actuate said latch out of gripping engagement with said rod; and circuit means connecting said first electromagnetic means in series electrical relationship with said second electromagnetic means to effect simultaneous energization thereof, the relationship between said first biasing means and first electromagnetic means and between said second biasing means and second electromagnetic means being selected such that said self-closing latch is actuated to disengage from the rod following actuation of said rod moving latch into gripping engagement therewith upon energization of said first and second electromagnetic means and said rod moving latch disengages from the rod folowing said self-closing latch moving into gripping engagement therewith upon termination of energization of said first and second electromagnetic means.

4. The combination of claim 3 wherein said first electromagnetic means for actuating said rod moving latch includes means for effecting actuation of said rod moving latch at a first electrical current in said series connected circuit and said second electromagnetic means for actuating said self-closing latch includes means for effecting actuation of said self-closing latch at a second electrical current in said series connected circuit greater than said first current.

5. The combination of claim 4 wherein the biasing forces of said first and second biasing means respectively are overcome by first and second magnetomotive actuating forces respectively and said first electromagnetic means include a first solenoid coil having a first number of conductive turns for producing said first magnetomotive actuating force at said first electrical current and said second electromagnetic means include a second solenoid coil having a second number of conductive turns less than said first for producing said second magnetomotive actuating force at said second electrical current greater than said first.

6. The combination of claim 5 including means for switchably applying a predetermined voltage across said first and second solenoid coils connected in series for providing said first and second currents therein, the inductance of said coils in said circuit creating a time lag between the attainment of said first and second currents respectively.

7. The combination of claim 6 wherein said first electromagnetic means include first and second magnets moveable relative to one another and having said rod moving latch connected to one of said magnets; said second electromagnetic means include first and second magnets moveable relative to one another and having said self-closing latch connected to one of said magnets; each of said first and second magnets associated with said first and second electromagnetic means being moveable between a near and far position relative to one another when said electromagnetic means are respectively energized and de-energized, and means for maintaining a non-magnetic gap between said magnets in the near portion which is greater for said magnets associated with said second electromagnetic means than for said magnets associated with said first electromagnetic means.

* * * * *

UNITED STATES PATENT OFFICE
CERTIFICATE OF CORRECTION

Patent No. 3,765,585             Dated October 16, 1973

Inventor(s) Christian William Ruoss

It is certified that error appears in the above-identified patent and that said Letters Patent are hereby corrected as shown below:

Column 2, line 22, change "operating" to --operation--.

Column 7, line 18, change "t" to --$t_0$--.

Column 8, line 38, after "means" delete --,--.

Column 10, line 27, change "portion" to --position--.

Signed and sealed this 23rd day of July 1974.

(SEAL)
Attest:

McCOY M. GIBSON, JR.
Attesting Officer

C. MARSHALL DANN
Commissioner of Patents